US005454584A

United States Patent [19]
Haut et al.

[11] Patent Number: 5,454,584
[45] Date of Patent: Oct. 3, 1995

[54] COLLAPSABLE STROLLER

[75] Inventors: Robert E. Haut, Wayne; James A. Sack, Elverson, both of Pa.

[73] Assignee: Graco Children's Products, Inc., Elverson, Pa.

[21] Appl. No.: 49,468

[22] Filed: Apr. 20, 1993

[51] Int. Cl.⁶ ..................................................... B62B 7/08
[52] U.S. Cl. ........................ 280/642; 280/650; 297/16.2; 297/46
[58] Field of Search ................... 297/16.2, 46; 280/642, 280/650, 641, 647, 658, 47.38, 47.4

[56] References Cited

U.S. PATENT DOCUMENTS

| | | |
|---|---|---|
| D. 296,540 | 7/1988 | Perego . |
| D. 298,815 | 12/1988 | Kassai . |
| D. 300,310 | 3/1989 | Kassai . |
| D. 305,012 | 12/1989 | Bigo et al. . |
| D. 305,013 | 12/1989 | Bigo et al. . |
| D. 305,316 | 1/1990 | Lin . |
| D. 305,317 | 1/1990 | Kassai . |
| D. 307,249 | 4/1990 | Yee et al. . |
| D. 307,250 | 4/1990 | Kassai . |
| D. 307,879 | 5/1990 | Giambrone . |
| D. 308,656 | 6/1990 | Takahashi et al. . |
| D. 310,645 | 9/1990 | Julien . |
| D. 311,363 | 10/1990 | Lin . |
| D. 317,280 | 6/1991 | Takahashi et al. . |
| D. 319,906 | 9/1991 | Takahashi et al. . |
| D. 320,370 | 10/1991 | Takahashi et al. . |
| D. 321,850 | 11/1991 | Mong-Hsing . |
| D. 325,550 | 4/1992 | Kato et al. . |
| D. 328,047 | 7/1992 | Huang . |
| D. 329,832 | 9/1992 | Ishikura et al. . |
| D. 331,208 | 11/1992 | Peebles et al. . |
| D. 335,642 | 5/1993 | Huang . |
| 3,967,342 | 7/1976 | Gebhard . |
| 4,108,468 | 8/1978 | Orlanski . |
| 4,173,355 | 11/1979 | Perego . |
| 4,232,897 | 11/1980 | Maciaren, deceased et al. . |
| 4,542,915 | 9/1985 | Wheeler, III et al. . |
| 4,564,212 | 1/1986 | Orlandino et al. ........................ 280/642 |
| 4,632,421 | 12/1986 | Shamie . |
| 4,725,071 | 2/1988 | Shamie . |
| 4,741,551 | 5/1988 | Perego . |
| 4,762,335 | 8/1988 | Kassai . |
| 4,763,911 | 8/1988 | Gebhard et al. . |
| 4,763,919 | 8/1988 | Nakao et al. . |
| 4,765,644 | 8/1988 | Bell . |
| 4,765,645 | 8/1988 | Shamie . |
| 4,768,795 | 9/1988 | Mar . |
| 4,773,124 | 9/1988 | Nakao et al. . |
| 4,779,879 | 10/1988 | Kassai . |
| 4,805,928 | 2/1989 | Nakao et al. . |
| 4,817,982 | 4/1989 | Kassai . |
| 4,819,958 | 4/1989 | Perego . |
| 4,832,361 | 5/1989 | Nakao et al. . |

(List continued on next page.)

FOREIGN PATENT DOCUMENTS 0258826  3/1988  European Pat. Off. .

OTHER PUBLICATIONS

*Graco Catalog*, 1981, pp. 10–13.
*Graco Children's Products Catalog*, 1992.
AD—Graco Aristocrat.
*Century 1993 Catalog*, Believed to be Released Oct., 1992.

Primary Examiner—Eric D. Culbreth
Assistant Examiner—Michael Mar
Attorney, Agent, or Firm—Pennie & Edmonds

[57] ABSTRACT

A collapsable stroller for transporting a passenger includes a frame movable between a collapsed position and an operating position. The frame includes rotatably mounted wheels for providing the stroller with mobility. A passenger seat is provided for receiving the passenger. At least a portion of the passenger seat is movably mounted on the frame between a first position and a second position. A latch is mounted on the frame and the seat. The latch releasably holds the seat in the first position. The latch, seat and frame are configured such that when the seat is in the first position and the frame is moved from the operating position to the collapsed position, the latch automatically releases the seat and the seat moves to the second position.

34 Claims, 7 Drawing Sheets

U.S. PATENT DOCUMENTS

| | | |
|---|---|---|
| 4,836,573 | 6/1989 | Gebhard . |
| 4,848,787 | 7/1989 | Kassai . |
| 4,856,809 | 8/1989 | Kohus et al. . |
| 4,892,327 | 1/1990 | Cabagnero . |
| 4,906,017 | 3/1990 | Kassai . |
| 4,915,401 | 4/1990 | Severson et al. . |
| 5,056,805 | 10/1991 | Wang . |
| 5,071,146 | 12/1991 | Lewis et al. . |
| 5,087,066 | 2/1992 | Mong-Hsing . |
| 5,104,180 | 4/1992 | Takahashi et al. .................. 280/642 X |
| 5,121,940 | 6/1992 | March . |
| 5,123,767 | 6/1992 | Ishikura et al. . |
| 5,143,398 | 9/1992 | Teng . |
| 5,144,717 | 9/1992 | Siesholtz et al. . |
| 5,149,115 | 9/1992 | Sampedro . |
| 5,158,319 | 10/1992 | Norcia et al. . |
| 5,167,425 | 12/1992 | Chen . |
| 5,168,601 | 12/1992 | Lin . |
| 5,181,735 | 1/1993 | Onishi . |
| 5,184,835 | 2/1993 | Huang . |
| 5,192,091 | 3/1993 | Lin . |
| 5,195,770 | 3/1993 | Ishikura . |
| 5,197,753 | 3/1993 | Liu ......................................... 280/642 |
| 5,201,535 | 4/1993 | Kato et al. . |
| 5,203,577 | 4/1993 | Kato et al. . |
| 5,205,577 | 4/1993 | Lin . |
| 5,205,578 | 4/1993 | Lin . |
| 5,205,579 | 4/1993 | Kato et al. . |
| 5,244,228 | 9/1993 | Chiu ....................................... 280/642 |
| 5,257,799 | 11/1993 | Cone et al. ............................ 280/642 |

COLLAPSABLE STROLLER

FIELD OF THE INVENTION

The present invention is directed to a collapsable stroller and, more particularly, to a collapsable stroller which can be readily collapsed and locked in the collapsed position.

BACKGROUND OF THE INVENTION

Collapsable strollers have been known and sold throughout the United States. Such collapsable strollers include a seat for receiving the passenger of the stroller. Typically, the seat is movably mounted on the frame of the stroller between a first position wherein the seat is configured for receiving the passenger in a sitting position and a second position wherein the seat is configured for receiving the passenger in a recumbent position. When the user collapses the stroller it is usually necessary that the seat be in one of the first or second positions or the stroller is not collapsable. That is, the seat must be in a predetermined position in order for it to be collapsable. Thus, before collapsing the stroller the user must first take the time to place the seat in the position which permits the stroller to be collapsed. Hence, a need has arisen for a stroller which is collapsable regardless of the position of the seat.

Other known collapsable strollers are problematic in that once they are in the collapsed position, they may unfold and become awkward to handle. That is, there is no means for locking the stroller in the collapsed position to prevent the stroller from unfolding during handling. Hence, a need exists for a stroller which is automatically locked in the collapsed position upon collapsing the stroller.

Other known strollers have horizontal push or grip handles which extend from the stroller. It is not uncommon for the user of the stroller to travel extended distances over a relatively long period of time. The use of a horizontal push or grip handle in a stroller is not ergonomically correct and leads to discomfort for the user after a short period of time. Therefore, a need has arisen for a push or grip handle for a stroller which is ergonomically correct to allow the user to travel extended distances in as much comfort as possible.

The present invention overcomes many of the disadvantages inherent in the above-described strollers. The collapsable stroller of the present invention is collapsable regardless of whether the seat is in the first or second positions. Upon collapsing the stroller of the present invention, the stroller is locked in the collapsed position to prevent the stroller from unfolding and becoming awkward to transport. Further, the handle of the collapsable stroller of the present invention is angled in an ergonomically correct manner to provide comfort to the user of the stroller.

SUMMARY OF THE INVENTION

Briefly stated, the present invention is a collapsable stroller for transporting a passenger. The stroller includes a frame movable between a collapsed position and an operating position. A passenger support receives the passenger. At least a portion of the support is movably mounted on the frame between a first position and a second position. A latch is mounted on the frame and support. The latch releasably holds the support portion in the first position. The latch, support and frame are configured such that when the support portion is in the first position and the frame is moved from the operating position to the collapsed position the latch automatically releases the support portion and the support portion moves to the second position.

In another aspect of the invention, the stroller includes a frame movable between a collapsed position and an operating position. The frame includes a set of wheels rotatably mounted thereon for providing the stroller with mobility. A passenger support is mounted on the frame. A locking device mounted on the frame releasably locks the frame in the collapsed position.

In another aspect of the invention, the stroller is provided with an ergonomically correct grip handle.

DESCRIPTION OF THE DRAWINGS

The foregoing summary, as well as the following detailed description of the preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings.

DESCRIPTION OF THE PREFERRED EMBODIMENT

Figure 1:
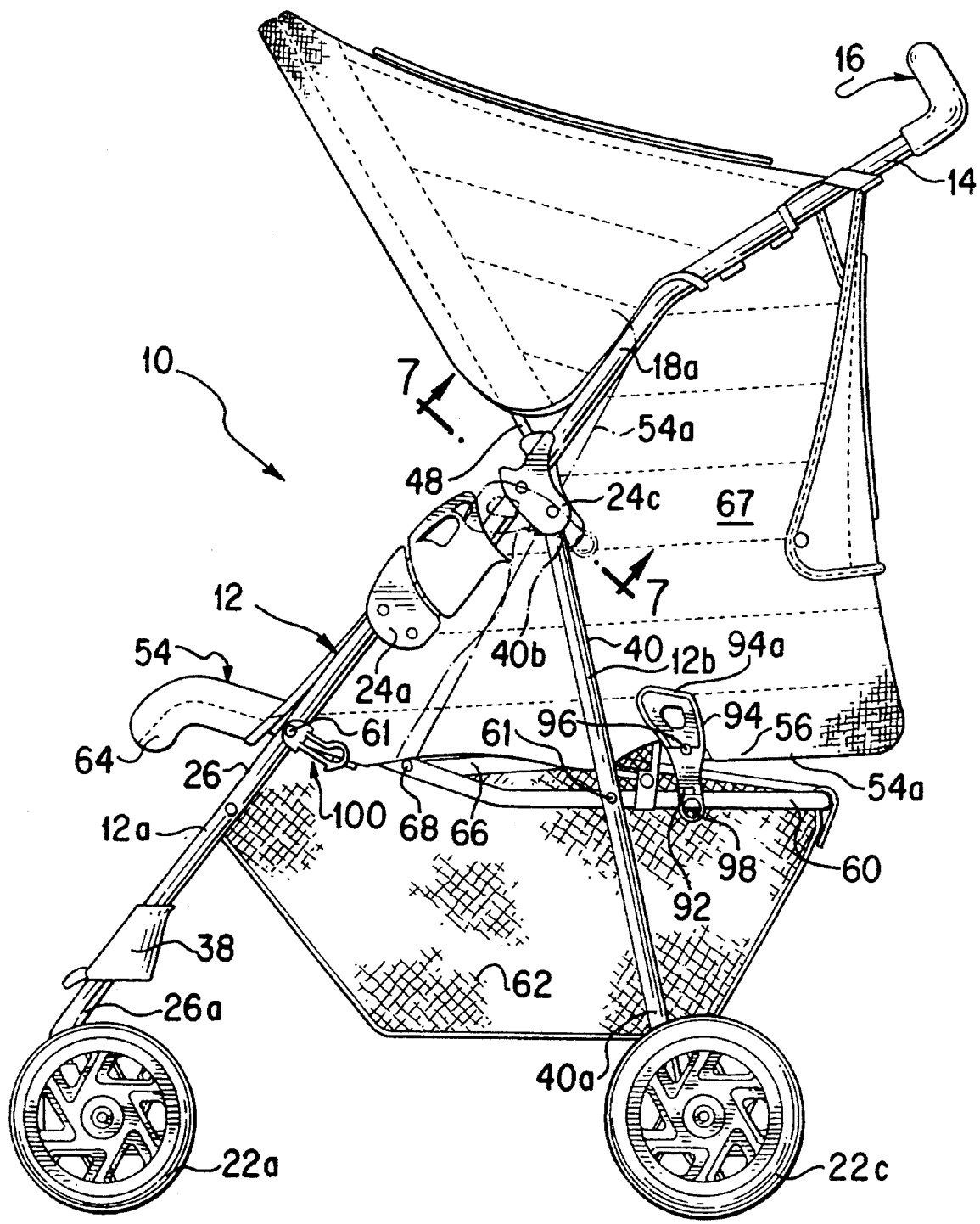
FIG. 1 is a right elevational view of a collapsable stroller in accordance with the present invention.

Certain terminology is used in the following description for convenience only and is not limiting. The words "right, " "left, " "lower" and "upper" designate , directions in the drawings to which reference is made. The words "inwardly" and "outwardly" refer to directions toward and away from, respectively, the geometric center of the collapsable stroller and designated parts thereof. The terminology includes the words above specifically mentioned, derivatives thereof and words of similar import.

Referring to the drawings in detail, wherein like numerals indicate like elements throughout, there is shown in FIGS. 1 through 7 a preferred embodiment of a collapsable stroller, generally designated 10, for transporting a passenger (not shown). Generally, the stroller 10 is intended for transporting children, but the inventive principles are applicable to strollers for adults as well. FIG. 1 is a right elevational view of the collapsable stroller 10, hereinafter referred to as the "stroller" 10. The stroller 10 includes a frame 12 movable between a collapsed position (shown in FIG. 3) and an operating position (shown in FIG. 1). In the collapsed position the stroller 10 is not usable and folded to a generally flat configuration to permit the stroller 10 to be readily stored. In the operating position the stroller 10 is configured to receive and transport the passenger in a manner well understood by those skilled in the art.

Figure 4:
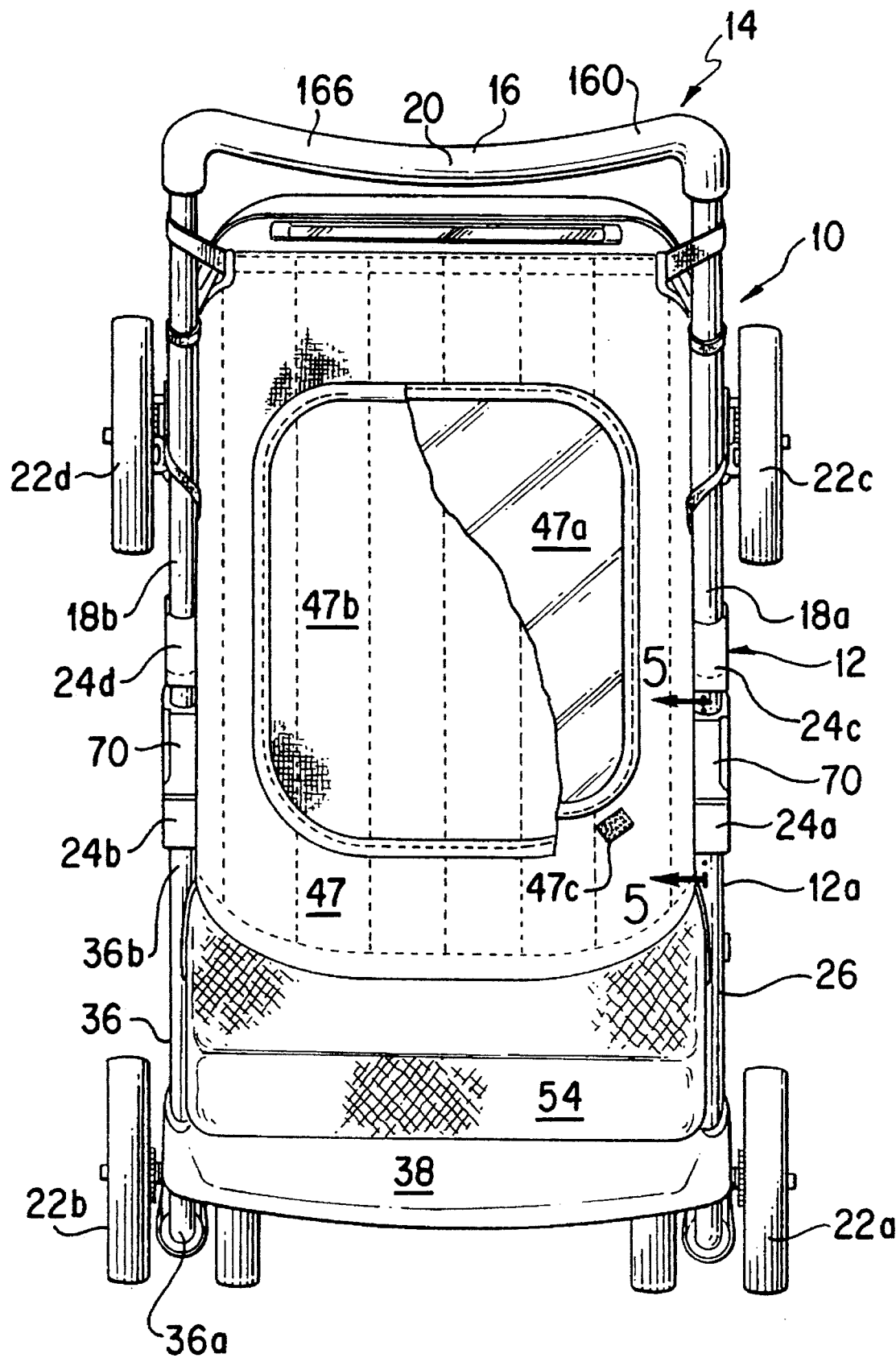
FIG. 4 is an enlarged top plan view of the collapsable stroller shown in FIG. 1.

Referring now to FIGS. 1 and 4, the frame 12 includes a handle 14 having a gripping portion 16. The handle 14 includes first and second arms 18a, 18b extending from the gripping portion 16. That is, the gripping portion 16, first arm 18a, and second arm 18b are configured to be generally U-shaped in plan view. The handle 14 is preferably constructed of a metallic tube, which is generally circular in cross section. A pad 20 is disposed over the gripping portion 16 to provide the user with a degree of comfort while pushing the stroller 10. It is understood by those skilled in the art that the gripping portion 16 could be formed of a polymeric material and the first and second arms 18a, 18b could be constructed of a metallic tube.

As best shown in FIGS. 1 and 4, the gripping portion 16 includes a first area 16a for receiving a first hand of a user (not shown) and a second area 16b for receiving a second hand of the user (not shown). The first and second areas 16a, 16b extend at an angle of less than one hundred eighty degrees with respect to each other. This provides the gripping portion 16 with an ergonomically correct design which enables the user to push the stroller 10 in comfort.

Figure 2:
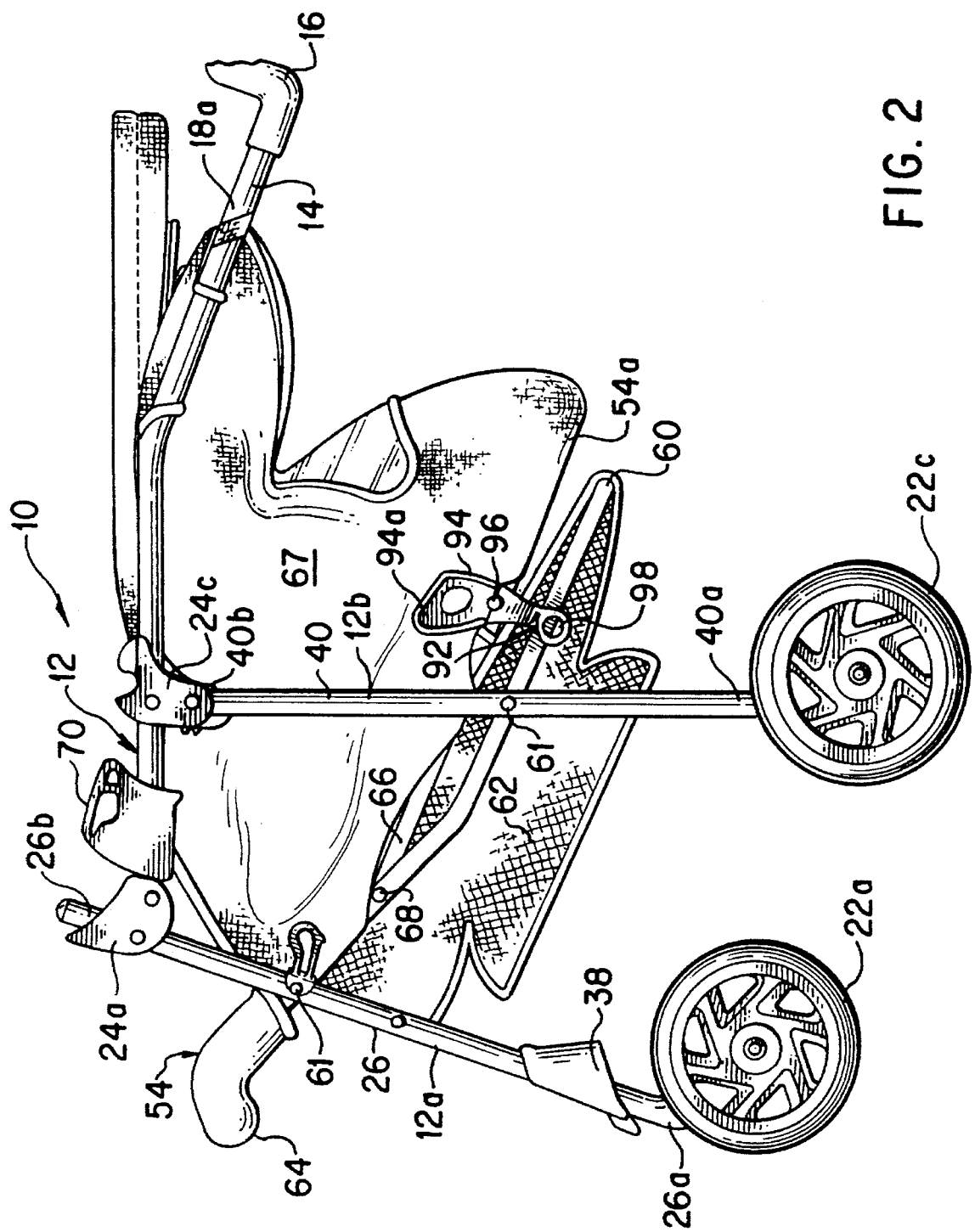
FIG. 2 is a right elevational view of the collapsable stroller shown in FIG. 1 in a partially collapsed position.

Referring now to FIGS. 1, 2 and 4, the frame 12 further comprises a first sub-frame 12a having first and second wheels 22a, 22b rotatably mounted thereon. The first sub-frame 12a includes first and second hinges 24a, 24b interconnected between the handle 14 and the first sub-frame 12a such that the first sub-frame 12a is pivotally mounted to the handle 14 for movement between the collapsed and operating positions, as described in more detail hereinafter.

Figure 3:
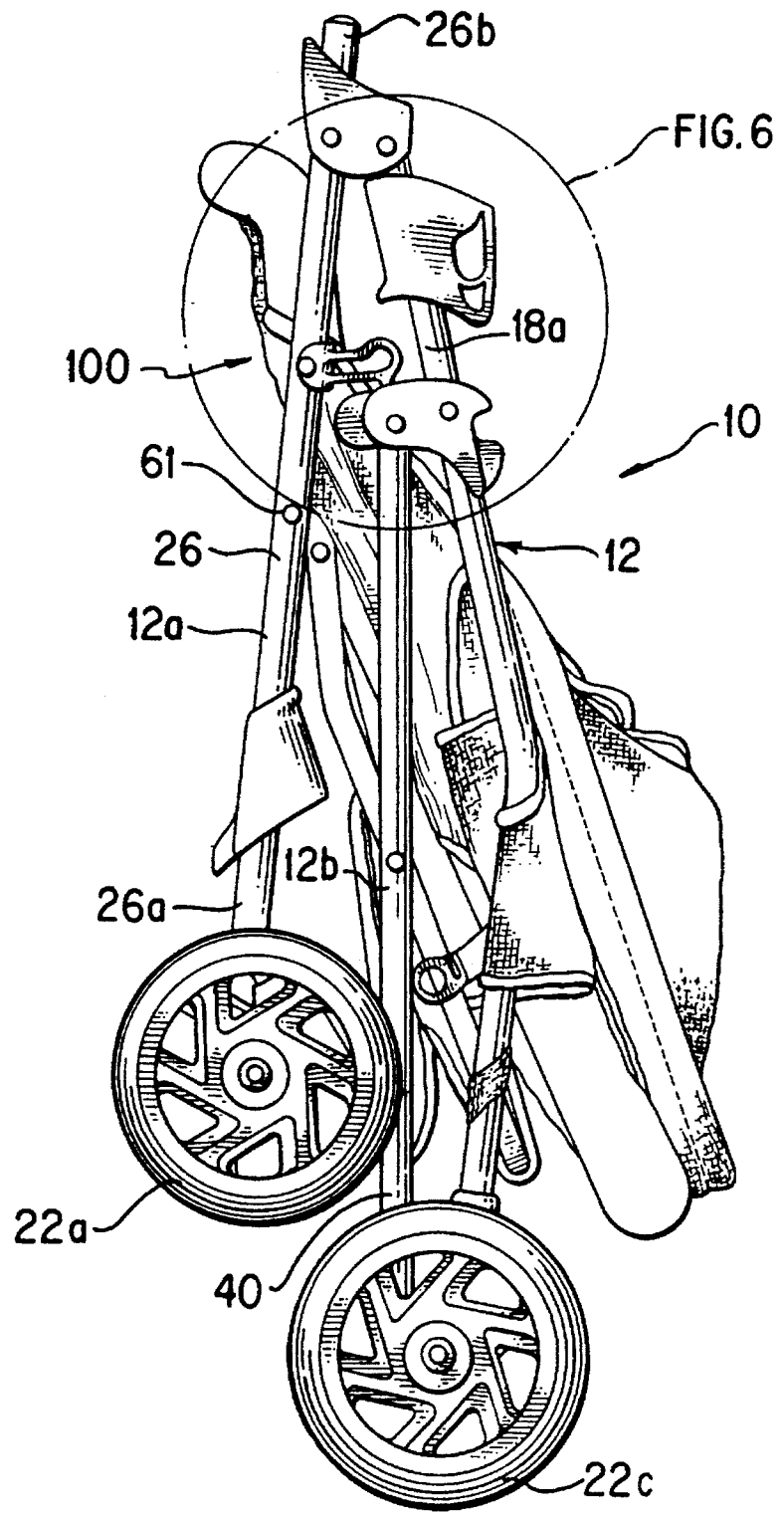
FIG. 3 is a right elevational view of the collapsable stroller shown in FIG. 1 in a collapsed position.
Figure 5:
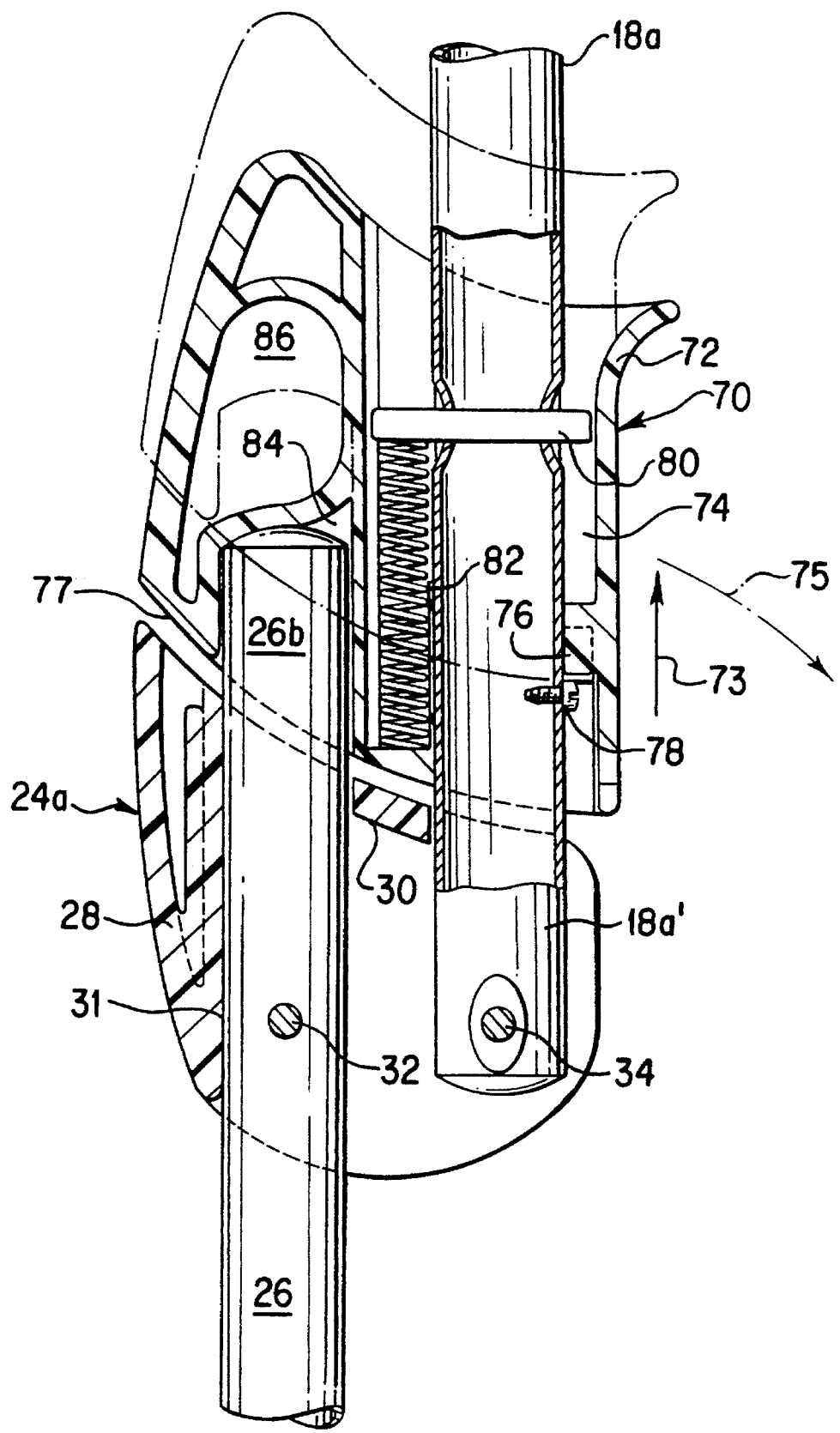
FIG. 5 is a greatly enlarged cross-sectional view of the collapsable stroller shown in FIG. 4, taken along lines 5—5 of FIG. 4.

Referring now to FIGS. 1, 3 and 5 in the present embodiment, it is preferred that the first sub-frame 12a comprise a first leg 26 having a first end 26a and a second end 26b. The first end 26a of the first leg 26 includes the first wheel 22a rotatably mounted thereon in a manner not pertinent to the present invention and well understood by those skilled in the art. The first hinge 24a is interconnected between the first leg 26 and a distal end 18a' of the first arm 18a such that the first leg 26 pivots with respect to the first arm 18a.

As shown in FIG. 5, in the present embodiment it is preferred that the first hinge 24a be comprised of a body 28 which includes an aperture 30 and bearing surface 31 for firmly receiving the second end 26b of the first leg 26 therein. A portion of the second end 26b of the first leg 26 protrudes outwardly from the body 28, for reasons described hereinafter. A pin 32 secures the second end 26b of the first leg 26 within the body 28 to prevent the first leg 26 from moving with respect to the body 28. The distal end 18a' of the first arm 18a is secured to the body 28 by a second pin 34 such that the first arm 18a is pivotable with respect to the body 28. The body 28 is constructed to allow the first arm 18a to pivot with respect to the body 28 and first leg 26 between a first position (see FIG. 5) wherein the first leg 26 and first arm 18a extend generally parallel with respect to each other and a second position (see FIG. 3) wherein the first leg 26 and first arm 18a are folded toward each other and form an acute angle therebetween.

The pin 32, second pin 34 and the remaining pins described hereinafter are preferably standard fastening elements, such as rivets. Although other fastening elements, such as nuts and bolts, could be used without departing from the spirit and scope of the invention. The body 28 of the first hinge 24a is preferably constructed of a polymeric material and formed by a suitable molding process.

Similarly, the first sub-frame 12a includes a second leg 36 having a first end 36a and a second end 36b. The first end 36a of the second leg 36 includes the second wheel 22b rotatably mounted thereon in a manner not pertinent to the present invention and well understood by those skilled in the art. The first and second legs 26, 36 are preferably constructed of the same material as the handle 14. The second hinge 24b is interconnected between the second leg 36 and a distal end of the second arm 18b such that the second leg 36 pivots with respect to the second arm 18b. The second hinge 24b is generally identical to the first hinge 24a described above except it is a mirror image thereof. Accordingly, further description is omitted for purposes of brevity and convenience only, and is not limiting.

As shown in FIGS. 1 and 4, a foot rest 38, in the form of a metallic tube (not shown) covered by a plastic shield, is connected between the first and second legs 26, 36 proximate the first and second wheels 22a, 22b. The metallic tube provides the first sub-frame 12a with structural integrity. The foot rest 38 is not pertinent to the present invention and can be constructed in any manner well understood by those skilled in the art. Therefore, further description of the foot rest 38 is omitted for purposes of convenience only, and is not limiting.

Referring now to FIGS. 1, 2 and 4, the frame 12 further includes a second sub-frame 12b having third and fourth wheels 22c, 22d rotatably mounted thereon. The second sub-frame 12b includes third and fourth hinges 24c, 24d interconnected between the first and second arms 18a, 18b, respectively, of the handle 14 and the second sub-frame 12b such that when the second sub-frame 12b is pivotally mounted to the handle 14 for movement between the collapsed and operating positions. It is preferred that the third and fourth hinges 24c, 24d be mounted to the first and second arms 18a, 18d between the first and second hinges 24a, 24b of the first sub-frame 12a and the gripping portion 16.

In the present embodiment, the second sub-frame 12b comprises a third leg 40 having a first end 40a and a second end 40b. The first end 40a of the third leg 40 has the third wheel 22c rotatably mounted thereon in a manner not pertinent to the present invention and well understood by those skilled in the art. The third hinge 24c is interconnected between the third leg 40 and the first arm 18a such that the third leg 40 pivots with respect to the first arm 18a. Similarly, the second sub-frame 12b includes a fourth leg having a first end and a second end. The fourth leg is not shown in the drawings, but is generally identical to the third leg 40, except that it is positioned on the contralateral side of the stroller 10. The first end of the fourth leg has the fourth wheel 22d rotatably mounted thereon in a manner not pertinent to the present invention and well understood by those skilled in the art. The fourth hinge 24d is interconnected between the fourth leg and the second arm 18b such that the fourth leg pivots with respect to the second arm 18b.

Figure 6:
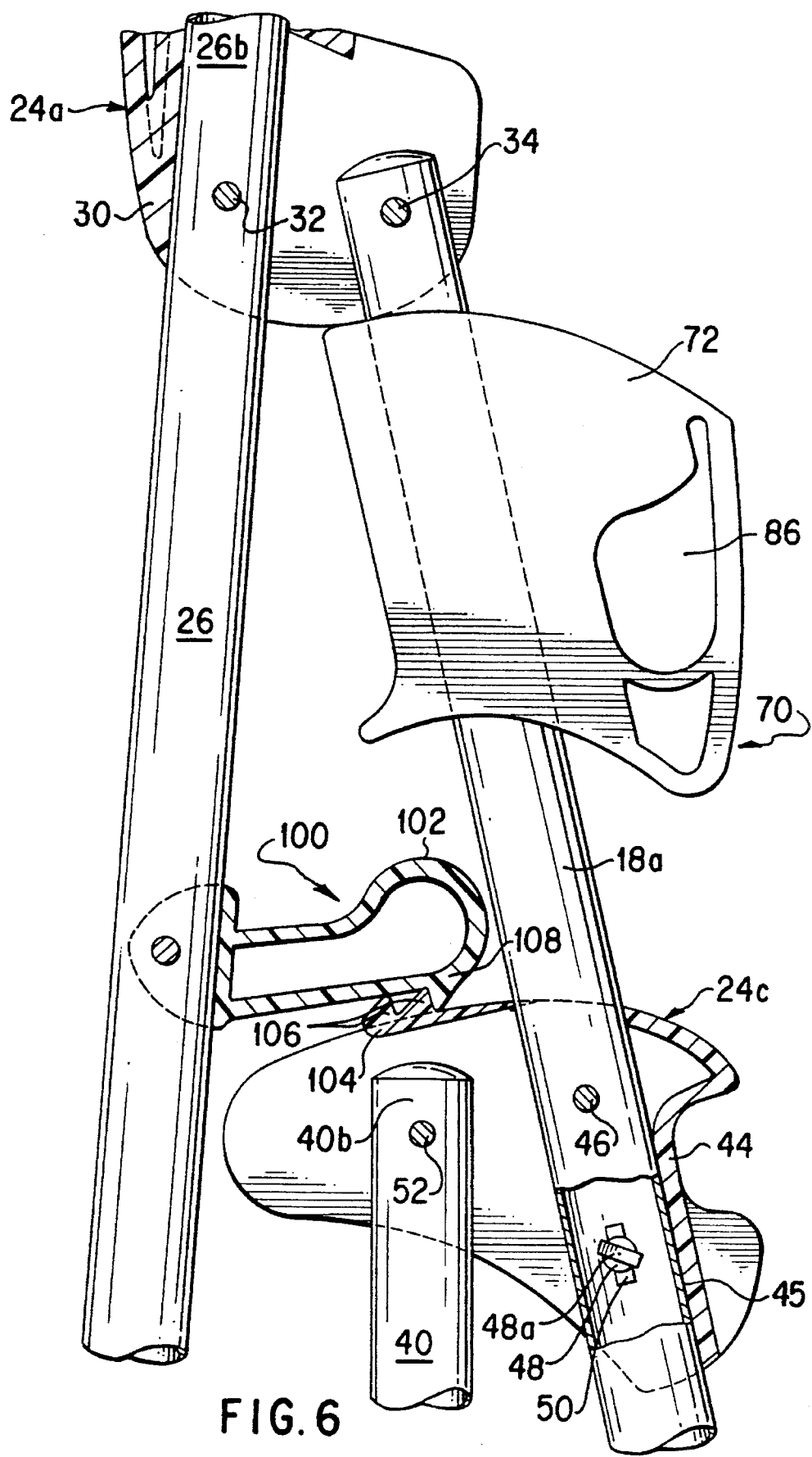
FIG. 6 is a greatly enlarged fragmentary view of the collapsable stroller shown in FIG. 3.
Figure 7:
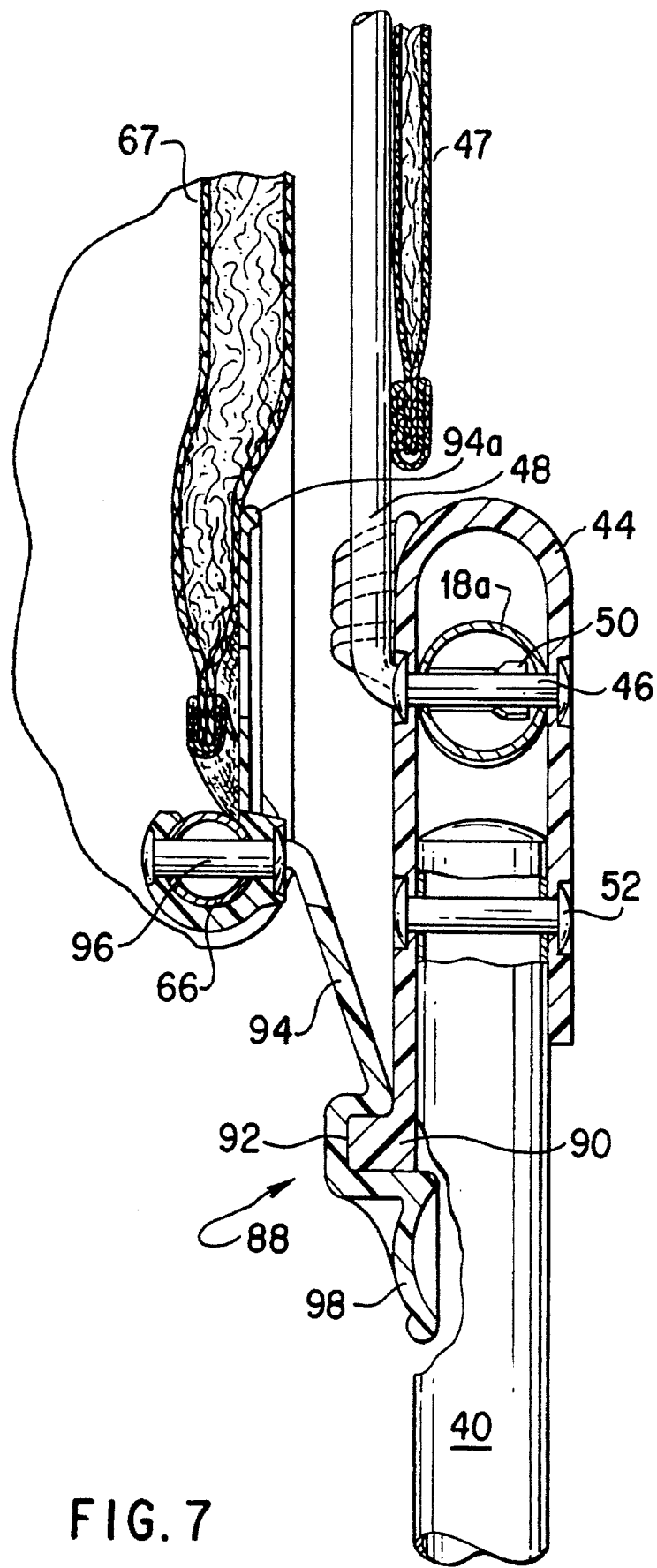
FIG. 7 is a greatly enlarged cross-sectional view of the collapsable stroller shown in FIG. 1 with the back of the seat in the position shown in phantom, taken along lines 7—7 of FIG. 1.

As shown in FIGS. 6 and 7, the third hinge 24c is comprised of a hinge member 44 which is secured to the first arm 18a by a pin 46 and canopy support rod 48. The pin 46 extends through a suitably sized aperture in the first arm 18a and secures the first arm 18a to the hinge member 44. The support rod 48 includes an interlocking member 48a at its distal end which cooperates with slots 50 in the first arm 18a and hinge member 44 to interlock the hinge member 44 and the first arm 18a together in a manner well understood by those skilled in the art. The hinge member 44 includes a bearing surface 45 which receives the first arm 18a. The bearing surface 45, pin 46 and support rod 48 cooperate to fix the hinge member 44 to the first arm 18a.

The support rod 48 is rotatably mounted to the first and second arms 18a, 18b to permit the canopy 47 to be moved between a position where it extends outwardly from the handle 14 to shade the stroller 10 and a position where it is pulled against handle 14, as is well understood by those skilled in the art. As shown in FIG. 4, the canopy 47 includes a window 47a for permitting the user to monitor the passenger during use of the stroller 10. A hinged flap 47b is provided for selectively covering the window 47a and is securable to the canopy 47 by hook and loop material 47c. The use and structure of the canopy 47 do not form a pertinent part of the present invention and are well understood by those skilled in the art and, therefore, further description thereof is omitted for purposes of convenience only, and is not limiting.

As shown in FIGS. 1, 6 and 7, the second end 40b of the third leg 40 is pivotally connected to the hinge member 44 by a pin 52 such that the third leg 40 pivots with respect to the hinge member 44 between the operating position shown in FIG. 1 and the collapsed position shown in FIG. 3. The hinge member 44 is preferably constructed in a manner generally identical to the construction of the body 28 of the first hinge 24a. The fourth hinge 24d is similarly constructed to the third hinge 24c and, therefore, further description thereof is omitted for purposes of convenience only and is not limiting.

Referring now to FIGS. 1 and 4, the stroller 10 includes a passenger support, generally designated 54, for receiving the passenger. At least a portion 54a of the support 54 is movably mounted on the frame 12 between a first position (shown in phantom in FIG. 1) and a second position (shown in solid lines in FIG. 1). The support portion 54a is in the second position when the frame 12 is in the collapsed position and is movable between the first and second positions when the frame 12 is in the operating position. More particularly, when the support portion 54a is in the first position, the support portion 54a is configured for receiving the passenger in a sitting position and when the support portion 54a is in the second position the support portion 54a is configured for receiving the passenger in a recumbent or lying position.

In the present embodiment, it is preferred that the passenger support 54 be comprised of a seat mounted on the frame 12 and the support portion 54a of the passenger support 54 be comprised of a back of the seat. The support portion 54a is movably mounted on the frame 12 between the first and second positions such that the support portion 54a moves to the second position when the frame 12 is moved from the operating position to the collapsed position, as described in more detail hereinafter.

In the present embodiment, the passenger support 54 is formed by a generally rectangular base 60 which is positioned between the first, second, third and fourth legs 26, 36 and 40, respectively. That is, the base 60 is secured to the first, second, third and fourth legs 26, 36 and 40 by pins 61 which permit the base 60 to pivot with respect to the first and second sub-frames 12a, 12b. A mesh basket 62 hangs from the base 60 for providing a storage area for miscellaneous items (not shown). The forward portion of the base 60 extends beyond the first and second legs 26, 36 and includes a pad 64 to form the seat and provide the passenger with a degree of comfort. The support portion 54a of the passenger support 54 is in the form of an inverted generally U-shaped tube 66 having its distal ends pivotally connected to the base 60 by pins 68. The base 60 and tube 66 are preferably constructed of the same material as the handle 14. The support portion 54a of the passenger support 54 further includes a cloth material (not shown) stretched between the legs of the U-shaped tube 66 to provide the passenger with a degree of comfort. A rear canopy 67 extends between the tube 66 and handle 14 for further shading the passenger. The use and structure of the rear canopy 67 and cloth material of the tube 66 are well understood by those skilled in the art, and do not form a part of the present invention. Therefore, further description thereof is omitted for the purposes of convenience only, and is not limiting.

Referring now to FIGS. 1, 2 and 5, the stroller 10 includes a first locking device 70 for locking the frame 12 in the operating position. In the present embodiment, the locking device 70 comprises a catch 72 slidably disposed on the distal end 18a' of the first arm 18a. The slidable catch 72 includes an elongate aperture 74 for receiving the distal end 18a' of the first arm 18 therethrough. The slidable catch 72 includes a boss 76 depending inwardly into slidable engagement with the first arm 18a. The catch 72 includes a cam surface 77 for guiding the catch 72 over the second end 26b of the first leg 26, as described in more detail hereinafter. The catch 72 is preferably constructed of the same material as the body 28 of the first hinge 24a.

A screw 78 is threadably secured to the first arm 18a for engagement with the boss 76 to prevent the slidable catch 72 from being removed from the first arm 18a. A pin 80 is fixedly secured to and extends through the first arm 18a a short distance above the screw 78. A spring 82 is disposed between the pin 80 and a portion of the slidable catch 72 for biasing the slidable catch 72 toward the distal end 18a' of the first arm 18. The slidable catch 72 includes a second aperture 84 for receiving the second end 26b of the first leg 26 in a releasable manner.

A finger indent 86 is provided in the slidable catch 72 for allowing the user to position his or her finger in the indent 86 to lift and slide the slidable catch 72 along the first arm 18 in the direction of the arrow 73 until the second end 26b of the first leg 26 is no longer positioned within the second aperture 84. Once the second end 26b of the first leg 26 clears the second aperture 84, the first arm 18a is pivotable with respect to the first leg 26 in the direction of the arrow 75 due to the first hinge 24a to allow the frame 12 to assume the collapsed position. When the second end 26b of the first leg 26 is disposed within the second aperture 84, the first arm 18a and first leg 26a are locked with respect to each other to maintain the frame 12 in the operating position.

A functionally identical mirror image locking device 70 is positioned on the distal end 18b' of the second arm 18b for locking the second arm 18b to the second leg 36 in a manner which is identical to that described above. Accordingly, further description of the locking device 70 used in connection with the second arm 18b and the second leg 36 is omitted for purposes of convenience only, and is not limiting.

Referring now to FIGS. 1 and 7, the stroller 10 includes a latch 88 mounted on the frame 12 and passenger support 54. The latch 88 releasably holds the support portion 54a in the first position. That is, the latch 88, support 54 and frame 12 are configured such that when the support portion 54a is in the first position and the frame 12 is moved from the operating position to the collapsed position, the latch 88 automatically releases the support portion 54a and the support portion 54a moves to the second position.

In the present embodiment, the latch 88 is comprised of a boss 90 and a slot 92 respectively on the frame 12 and the support portion 54a. More particularly, the boss 90 is formed as part of the hinge member 44 of the third hinge 24c. The slot 92 is formed in a latch member 94 secured to the tube 66 of the support portion 54a. The latch member 94 is secured to the tube 66 by a pin 96. The boss 90 is positioned within the slot 92 when the support portion 54a is in the first position and the frame 12 is in the operating position. When the support portion 54a is in the first position and the frame 12 is moved from the operating position to the collapsed position, the boss 90 moves with respect to the slot 92 such that the boss 90 and slot 92 disengage to release the support portion 54a from the first position. That is, as the frame 12 is collapsed, the hinge 24c rotates, as best shown by comparing FIGS. 1 and 2, to move the boss 90 out of engagement with the slot 92. Support portion 54a drops under the force of gravity to the second position wherein the stroller may be collapsed.

The latch 88 further includes a flexible element or finger release 98 for manual release of the latch 88 to move the support portion 54a from the first position to the second position when the frame 12 is in the operating position. To manually release the latch 88, the user moves the flexible element 98 inwardly to allow the boss 90 to clear the slot 92 to permit the support portion 54a to fold downwardly to the second position.

The latch member 94 includes an ear 94a extending upwardly from the tube 66 for assisting in preventing the rear canopy 67 from interfering with the motion of the support rod 48 when the support portion is in the first position, as best shown in FIG. 7. The latch member 94 is preferably constructed of generally flexible elastic polymeric material. The material preferably has a degree of flexibility which permits the user to easily move the latch member 94 out of engagement with the boss 90.

An identical latch (not shown) is disposed on the contralateral side of the stroller 10 for allowing the member 66 to be coupled to the fourth hinge 24d in a generally identical manner. Thus, to manually release the latches 88, it is necessary to move the flexible elements 98 of both latches 88 inwardly to move the support portion 54 downwardly to the second position.

The latch 88 facilitates collapsing the stroller by eliminating the step of manually releasing two latches. Releasing the latches is necessary, since the stroller will not fully collapse if the support portion is in the first position.

While in the present embodiment, it is preferred that the latch 88 be configured and used as described above. It is understood by those skilled in the art that the latch 88 could be configured in other manners. For instance, the slot 92 could be open at both ends and the ear 94a could be omitted without departing from the spirit and scope of the present invention.

Referring now to FIGS. 1, 3 and 6, the frame 12 further includes a locking device 100 for releasably and automatically locking the frame 12 in the collapsed position. In the present embodiment, it is preferred that the locking device 100 extend between the first and second sub-frames 12a, 12b. That is, the locking device extends between the first leg 26a and the third hinge 24c.

In the present embodiment, the locking device 100 comprises a generally flexible finger 102 and cam lock 104 respectively extending between the first leg 26 and the third hinge 24c. The finger 102 is secured to the first leg 26 by a pin 103. The finger 102 is flexible such that the cam lock 104 catches the finger 102 when the frame 12 is moved to the collapsed position. That is, the cam lock 104 is comprised of a pair of ratchet teeth 106 formed on the hinge member 44 of the third hinge 24c and the finger 102 includes a pawl-like element 108. To release the locking device 100, the user merely lifts the finger 102 upwardly to disengage the pawl-like element 108 from the ratchet teeth 106 to thereby allow the frame 12 to be moved to the operating position. When the frame 12 is moved to the collapsed position, the ramps on the ratchet teeth 108 guide the pawl-like element 108 and finger 102 upwardly until the pawl-like element 108 passes over the top of each tooth 108 and snaps into the locked position. Thus, the locking device 100 automatically locks the frame 12 in the collapsed position when the frame 12 is collapsed.

While in the present embodiment it is preferred that the locking device 100 includes the pawl-like element 108 and ratchet teeth 106, it is understood by those skilled in the art that other structures could be used to automatically lock the frame 12 in the collapsed position. For instance, the hinge member 44 could include a suitably sized aperture (not shown) which could receive pawl-like element 108, without departing from the spirit and scope of the invention.

In use, assuming the frame 12 is in the operating position and the support portion 54a of the passenger support 54 is in the first position and the user desires to move the frame 12 to the collapsed position, using both hands, the user grabs the slidable catch 72 at the finger indent 86 and slides each slidable catch 72 upwardly along the first and second arms 18a, 18b until the second end 26b, 36b of the first and second legs 26, 36 clear the second aperture 84 of the slidable catch 72. The handle 14 then begins to fold downwardly and the first sub-frame 12a begins to move toward the second sub-frame 12b, as shown in FIG. 2. Simultaneously, the boss 90 and slot 92 move in opposite directions to release the support portion 54a from the first position. The user then continues to move the handle 14 toward the second sub-frame 12b, until the stroller 10 assumes the position shown in FIG. 3.

As the stroller 10 approaches the collapsed position, the locking device 100 automatically secures the first and second sub-frames 12a, 12b together to prevent the stroller 10 from unfolding.

To position the collapsed stroller 10 in the operating position, the user lifts the finger 102 upwardly such that the pawl-like element 108 becomes disengaged with the ratchet teeth 106. The user then lifts upwardly on the handle 14 until the cam surface 77 of the sliding catch 72 of the first locking devices 70 engages the second ends 26b, 36b of the first and second legs 26, 36. The second ends 26b, 36b of the first and second legs engage the cam surface 77 to cause the catch 72 to slide up the first and second arms 18a, 18b until the first and second arms 18a, 18b extend generally parallel the first and second legs 26, 36, respectively. The catches 72 then slide downwardly such that the second apertures 84 slide over the second ends 26b, 36b of the first and second legs 26, 36. Once the frame 12 is in the operating position, the support portion 54a is movable between the first and second positions, as desired by the user.

From the foregoing description, it can be seen that the present invention comprises a collapsable stroller which is collapsable regardless of the position of the stroller seat. It will be appreciated by those skilled in the art that changes and modifications may be made to the above-described embodiment without departing from the inventive concept thereof. It is understood, therefore, that the present invention is not limited to the particular embodiment disclosed, but is intended to include all modifications and changes which are within the scope and spirit of the invention as defined by the appended claims.

We claim:

1. A collapsible stroller for transporting a passenger, said stroller comprising:

a frame movable between a collapsed position and an operating position;

a passenger support for receiving the passenger, at least a portion of the support being movably mounted on said frame between a first position and a second position in said operating position, wherein said passenger support comprises a seat mounted on said frame and said movably mounted portion of said passenger support comprises a back, wherein said back is positioned upwardly for receiving the passenger in a seating position at said first position and said back is moved rearwardly and positioned for receiving the passenger in a recumbent or lying position at said second position; and a latch having interactive members mounted on said frame and said back, said latch releasably holding said back in said first position, said latch, support and frame being configured such that when said back is in said first position and said frame is moved from said operating position to said collapsed position said latch automatically releases said back such that said back automatically moves to said second position.

2. The stroller as recited in claim 1, wherein said frame includes first and second side arms which lie in a first plane, a hand gripping portion interconnecting said first and second arms, said gripping portion extending at a second plane such that said second plane intersects said first plane at an angle, and wherein said gripping portion is provided with mirror imaged first and second gripping sections.

3. The stroller as recited in claim 2, wherein said first ergonomically sloped gripping section is angles less than 180° relative to said second ergonomically sloped gripping section.

4. The stroller as recited in claim 1 wherein said frame further includes a locking device releasably locking said frame in said collapsed position.

5. The stroller as recited in claim 1, wherein said latch is mounted on said frame and said back.

6. The stroller as recited in claim 1 wherein said latch comprises a boss and slot respectively on said frame and said back, said boss being positioned within said slot when said back is in said first position and said frame is in said operating position.

7. The stroller as recited in claim 1 wherein said frame comprises:

a handle having a gripping portion, said handle including first and second arms extending from said gripping portion;

a first sub-frame having at least one wheel rotatably mounted thereon, said first sub-frame including at least one hinge interconnected between said handle and first sub-frame such that said first sub-frame is pivotally mounted for movement between the collapsed and operating positions; and a second sub-frame having at least one wheel rotatably mounted thereon, said second sub-frame including at least one hinge interconnected between said handle and said second sub-frame such that said second sub-frame is pivotally mounted for movement between the collapsed and operating positions, said second sub-frame hinge being mounted to said handle between said hinge of said first sub-frame and said gripping position; and said support portion being mounted for movement with respect to said first and second sub-frames between said first and second positions, said latch comprises a boss and a slot respectively on said hinge of said second sub-frame and said support portion, said boss being positioned within said slot when said support portion is in said first position and said frame is in said operating position.

8. The stroller as recited in claim 7 wherein when said support portion is in said first position and said frame is moved from said operating position to said collapsed position, said boss moves with respect to said slot to release said support portion from said first position.

9. The stroller as recited in claim 7 wherein said first sub-frame comprises:

a first leg having a first end and a second end, said first end of said first leg including a first wheel rotatably mounted thereon;

a first hinge interconnected between said first leg and a distal end of said first arm such that said first leg pivots with respect to said first arm;

a second leg having a first end and a second end, said first end of said second leg including a second wheel rotatably mounted thereon; and a second hinge interconnected between said second leg and a distal end of said second arm such that said second leg pivots with respect to said second arm; and said second sub-frame comprises:

a third leg having a first end and a second end, said first end of said third leg including a third wheel rotatably mounted thereon;

a third hinge interconnected between said third leg and said first arm such that said third leg pivots with respect to said first arm;

a fourth leg having a first end and a second end, said first end of said fourth leg including a fourth wheel rotatably mounted thereon; and a fourth hinge interconnected between said fourth leg and said second arm such that said fourth leg pivots with respect to said second arm; and said latch comprises a boss on said third hinge and a slot on said support portion, said boss being positioned within said slot when said support portion is in said first position and said frame is in said operating position.

10. The stroller as recited in claim 9 wherein when said support portion is in said first position and said frame is moved from said operating position to said collapsed position said boss moves with respect to said slot to release said support portion from said first position.

11. The stroller as recited in claim 7 wherein said gripping portion has a first area for receiving a first hand of a user and a second area for receiving a second hand of a user, said first and second areas extending at an angle of less than 180° with respect to each other.

12. A collapsible stroller for transporting a passenger, said stroller comprising:

a frame movable between a collapsed position and an operating position;

a passenger support for receiving the passenger, at least a portion of the support being movably mounted on said frame between a first position and a second position; and a latch mounted on said frame and support, said latch releasably holding said support portion in such first position, said latch, support and frame being configured such that when said support portion is in said first position and said frame is moved from said operating position to said collapsed position said latch automatically releases said support portion and said support portion moves to said second position, wherein said latch comprises a boss and a slot respectively on said frame and said support portion, said boss being positioned within said slot when said support portion is in said first position and said frame is in said operating position.

13. The stroller as recited in claim 12 wherein when said support portion is in said first position and said frame is moved from said operating position to said collapsed position said boss moves with respect to said slot to release said support portion from said first position.

14. The stroller as recited in claim 13 wherein the latch includes a flexible element for manual release of said latch.

15. A collapsible stroller for transporting a passenger comprising:

a frame movable between a collapsed position and an operating position, said frame including a set of wheels rotatably mounted thereon for providing the stroller with mobility, said frame comprising:

a handle having a gripping portion, said handle including first and second arms extending from said gripping portion;

a first leg having a first end and a second end, said first end of said first leg attached to a first wheel;

a first hinge interconnected between said first leg and a distal end of said first arm such that said first leg pivots with respect to said first arm;

a second leg having a first end and a second end, said first end of said second leg attached to a second wheel;

a second hinge interconnected between said second leg and a distal end of said second arm such that said second leg pivots with respect to said second arm;

a third leg having a first end and a second end, said first end of said third leg attached to a third wheel;

a third hinge spaced from and discrete from said first hinge and interconnected between said third leg and said first arm such that said third leg pivots with respect to said first arm;

a fourth leg having a first end and a second end, said first end of said fourth leg attached to a fourth wheel; and a fourth hinge spaced from and discrete from said second hinge and interconnected between said fourth leg and said second arm such that said fourth leg pivots with respect to said second arm;

a passenger support pivotally mounted to said frame; and a locking device formed on said first leg and said third hinge for releasably locking said frame in said collapsed position.

16. The stroller as recited in claim 15 wherein said locking device automatically locks said frame in said collapsed position.

17. The stroller as recited in claim 15 wherein said locking device comprises a finger and cam lock respectively extending between said first leg and said third hinge, said finger being flexible such that said cam lock catches said finger when said frame is moved to the collapsed position.

18. The stroller as recited in claim 15, wherein said first and second arms lie in a first plane and said gripping portion extends at a second plane such that said second plane intersects said first plane at an angle, and wherein said gripping portion is provided with mirror imaged first and second gripping sections which extend at an angle of less than 180° with respect to each other.

19. A frame for a collapsible stroller which is movable between a collapsed position and an open position comprising:

a handle having a gripping portion and a first arm and a second arm extending from ends of said gripping portion;

a first leg having a first end for connecting to a first wheel and a second end;

a first hinge interconnecting said first leg to said first arm to permit said first leg to pivot relative to said first arm;

a second leg having a first end for connecting to a second wheel and a second end;

a second hinge interconnecting said second leg to said second arm to permit said second leg to pivot relative to said second arm;

wherein at least one of said first and said second hinges is provided with a locking device to releasably lock respective said first or second arm relative to respective said first or second leg;

a third leg having a first end for connecting to a third wheel;

a third hinge interconnecting said third leg to said first arm to permit said third leg to pivot relative to said first arm;

a fourth leg having a first end for connecting to a fourth wheel;

a fourth hinge interconnecting said fourth leg to said second arm to permit said fourth leg to pivot relative to said second arm;

a base frame interconnecting said first, second, third and fourth legs, wherein each of said first, second, third and fourth legs are pivotally connected to said base frame;

a support frame having its ends pivotably connected to said base frame, wherein said support frame is pivotable between a first position in which said stroller is in said open position and a second position in which said stroller is in said collapsed position; and a latching device cooperating with said one of said third and fourth hinges for locking said support frame in said first position and for releasing said support frame from said first position to said second position when said handle is pivoted relative to said first and second legs.

20. A frame for a collapsible stroller according to claim 19, wherein said base frame is generally rectangular.

21. A frame for a collapsible stroller according to claim 19, wherein said support frame is generally U-shaped.

22. A frame for a collapsible stroller according to claim 21, wherein said U-shaped support frame is further pivotable relative to said base frame between said first and second positions when said stroller is in said open position, wherein said U-shaped support frame is in a recumbent position when said U-shaped support is in said second position and said U-shaped support frame is in an upright sitting position when said U-shaped support is in said first position.

23. A frame for a collapsible stroller according to claim 22, wherein said latching device comprises:

at least one latch member connected to said U-shaped support frame; and a latch catch formed on at least one of said third and fourth hinges, wherein said latch member engages and locks said latch catch when said U-shaped support frame is in said first position and wherein said latch member is released from said latch catch when said handle is pivoted relative to said first and second legs.

24. A frame for a collapsible stroller according to claim 23, wherein said latch member includes a slot and said latch catch is a boss formed on one of said third and fourth hinges, wherein said U-shaped support frame is locked when said boss engages said slot.

25. A frame for a collapsible stroller according to claim 24, wherein said latch member further includes a manual release for manually disengaging said slot from said boss.

26. A frame for a collapsible stroller according to claim 19, wherein at least one of said first and second hinges comprises:
- a first body attached to respective one of said first and second legs, said second end of said one leg protruding beyond said first body; and
- a second body movably coupled to respective one of said first and second arms to enable said second body to move substantially axially of said one arm, with a distal end of said one arm protruding beyond said second body,
  - wherein said distal end of said one arm is pivotably connected to said first body to permit said one arm to pivot relative to said first body, and
  - wherein said second body includes a seat for engaging said second end of said one leg which protrudes beyond said first body to pivotally immobilize said one arm relative to said one leg.

27. A frame for a collapsible stroller according to claim 26, wherein said second end of said one leg and said distal end of said one arm are substantially parallel when said seat is engaged with said second end of said one leg which protrudes beyond said first body.

28. A frame for a collapsible stroller according to claim 26, further comprising a biasing device interconnecting said one arm and said second body to urge said second body toward said distal end of said one arm.

29. A frame for a collapsible stroller according to claim 26, wherein said second body includes a finger indent for grabbing when axially moving said second body away from said first body to disengage said seat from said second end of said one leg which protrudes beyond said first body.

30. A frame for a collapsible stroller according to claim 19, wherein said first and second arms lie in a first plane and said gripping portion extends at a second plane such that said second plane intersects said first plane at an angle, and wherein said gripping portion is provided with mirror imaged first and second ergonomically sloped gripping sections.

31. A frame for a collapsible stroller according to claim 30, wherein said first ergonomically sloped gripping section is angled less than 180° relative to said second ergonomically sloped gripping section.

32. A frame for a collapsible stroller according to claim 19, further comprising:
- a locking device extending between said first leg and said third hinge for releasably locking said frame in said collapsed position.

33. A frame for a collapsible stroller according to claim 32, wherein said locking device comprises a resilient finger attached to one of said first leg and said third hinge, and a cam lock formed on the other of said first leg and said third hinge, wherein said finger lockingly engages with said cam lock.

34. A frame for a collapsible stroller according to claim 33, wherein said resilient finger is attached to said first leg and said cam lock formed on said third hinge.

* * * * *